Inventors:
Jack C. Trautman,
Frederic H. Middleton,

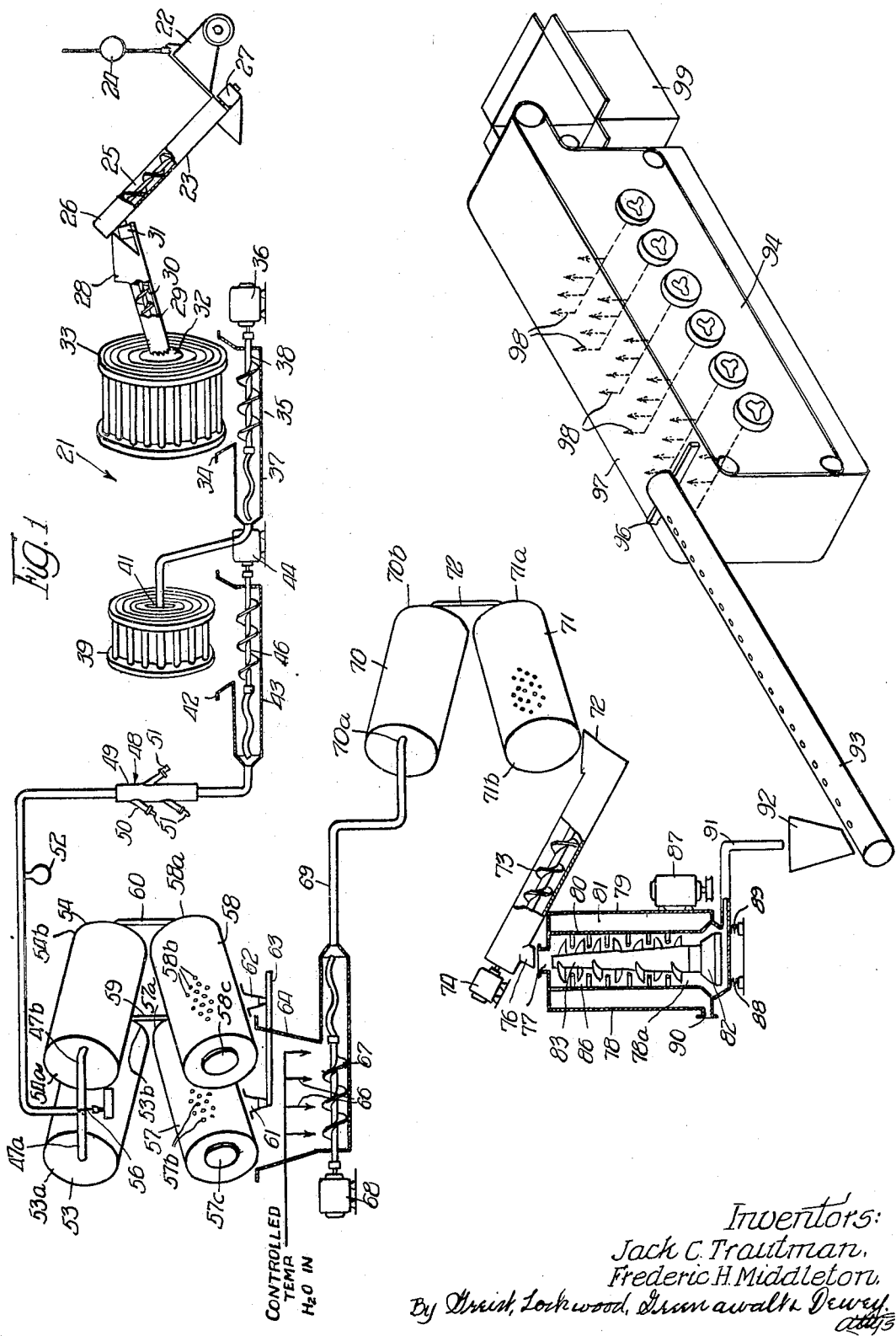

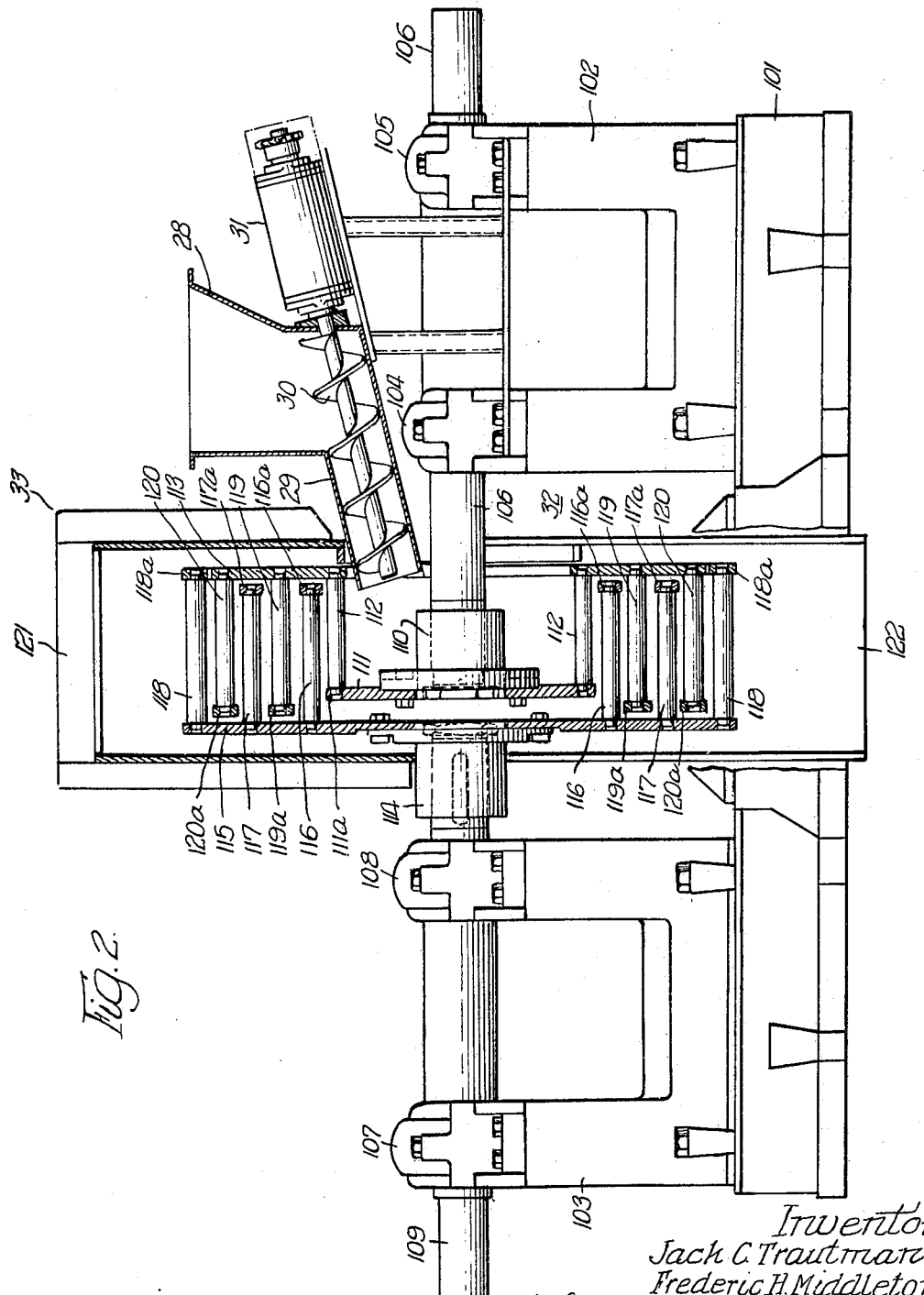

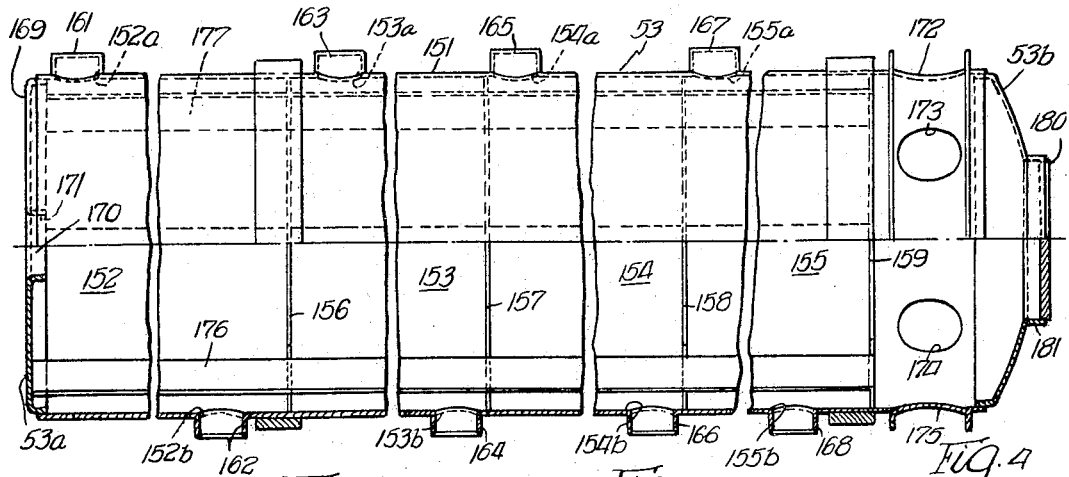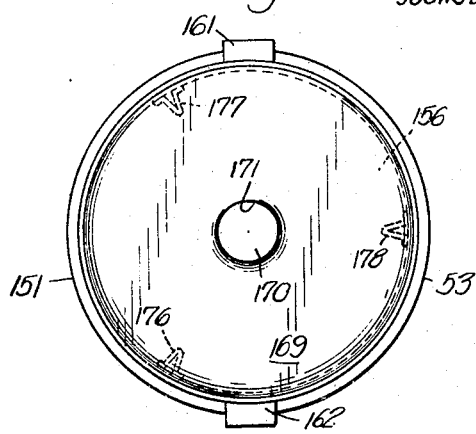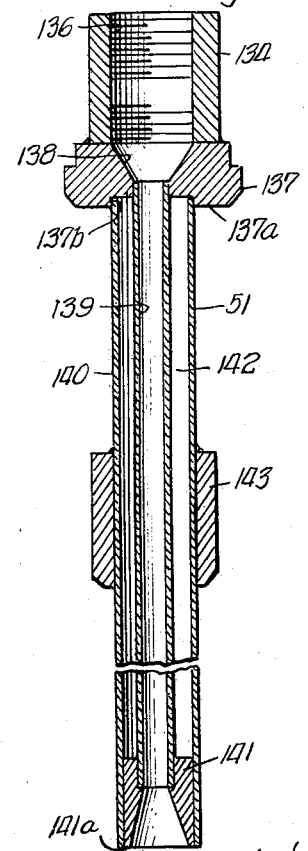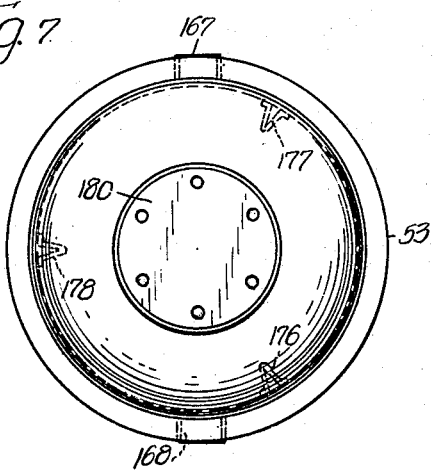

United States Patent Office 3,487,094
Patented Dec. 30, 1969

3,487,094
METHOD AND APPARATUS FOR SEPARATION OF FATTY TISSUE FROM ANIMAL SKINS
Jack C. Trautman and Frederic H. Middleton, Madison, Wis., assignors to Oscar Mayer & Co., Inc., Chicago, Ill., a corporation of Illinois
Filed May 23, 1966, Ser. No. 552,167
Int. Cl. C09h 1/04
U.S. Cl. 260—412.6                    8 Claims

ABSTRACT OF THE DISCLOSURE

A method of separating fatty tissue from animal skins such as, for example, pork skins, wherein the animal skins are initially processed in a cage mill to provide release of the fatty tissue from the skins and produce a heterogeneous skin and fat mass from which the fat constituent is separated. Typically, the heterogeneous skin and fat mass is then uniformly heated to a temperature sufficient to melt the fat and the melted fat, connective tissue and skin fines are separated from the defatted skin pieces in rotating perforated drums. The defatted skins can then be washed, pressed and, if desired, frozen to facilitate further handling and storage.

---

The present invention relates to the separation of fatty or adipose tissue from odd lot pieces of animal skin containing the same. More particularly, this invention is concerned with improvements and innovations in the separation of fatty tissue from animal skin pieces by novel cage mill type impact separation techniques. An important embodiment of the present invention is specifically directed to method and apparatus for the separation of fatty tissue from pork skins, which method and apparatus employ unique cage mill type impact separation techniques to produce an improved defatted pork skin product. Pork skins processed in accordance with the present invention are characterized by a substantially fat-free, non-degraded, non-denatured condition and provide an excellent source material for the manufacture of gelatin.

Various techniques have been developed and employed in the prior art for the separation of fatty or adipose tissue from animal skins. These techniques include rendering, fleshing, hashing, mechanical disintegration of fat in hammer mills and shearing of the fat from the animal skin pieces. None of these prior art techniques provides a defatted skin product of a quality equal to that obtained by the practice of the present invention. For example, rendering is unsatisfactory since the temperatures necessary to liquify the fat produce simultaneous extraction of the highest quality gelatin contained in the skin, thereby contaminating the liquified fat and reducing the amount of gelatin which can be subsequently recovered from the thus defatted skin.

Fleshing and grinding are unsatisfactory in that they are generally laborious techniques which produce substantial degradation of the skin, thereby reducing the quantity and quality of gelatin that can be extracted.

Mechanical fat disintegration methods generally require that the skin pieces be cut in a prebreaker prior to their being processed in the hammer mill. This technique commonly results in nonuniform removal of fat and in fraying of the edges of the skin pieces. Accordingly, in addition to the increased time and expense in processing animal skins by this prior art technique, there is the further disadvantage that the defatted skin product does not produce gelatin of a quality equal to that obtained from animal skins processed in accordance with the present invention.

Similarly, subjecting animal skins to shearing forces, such as by placing the skins between two closely spaced discs, does not provide the degree of fat removal, without skin degradation, which is obtainable by the practice of the present invention. In this regard, it is particularly important to note that the novel cage mill impact separation techniques of this invention permit the defatting of all types of skins in a manner wherein even skin pieces having tough connective tissue (i.e. bootjack and flank trimmings as well as picnic skins) are suitable for gelatin production. Heretofore such thin skin pieces having tough connective tissue were processed in rendering tanks only.

In accordance with the present invention, hog or other animal skin pieces containing fatty tissue are removed from the carcass of the animal, collected and then fed into the inlet of a cage mill wherein they are subjected to a unique type of impact treatment, readily distinguishable from the cutting, grinding and shearing which are characteristic of the above-mentioned prior art techniques. In the preferred embodiment of this invention, more fully explained below, the cage mill generally consists of a plurality of concentrically disposed cylindrical cages having wide frames with rods extending therebetween. Each of the cages is connected to one of two separate rotors so that adjacent cages exhibit counter-rotational movement with respect to each other.

In this connection, it is important to note that while the preferred embodiment of the present invention includes a two rotor cage mill, single rotor cage mills can be used in the process without departing from the scope of the present invention. Accordingly, as used in this application, the term "cage mill" refers to both single and two rotor cage mills as well as equivalent processing equipment (i.e. that which imparts an equivalent impact treatment for separation of fatty and adipose tissue from pork or other animal skin pieces). Similarly, the term "cage mill type impact separation techniques" is intended to cover treatment methods for separation of fatty and adipose tissue from pork or other animal skin pieces which are obtained by passing the skin pieces to be treated through a cage mill operated in accordance with the techniques and method of the present invention.

In passing through the cage mill, the cellular tissue which characterizes the fatty constitutent of the meat is broken up resulting in the fatty or adipose tissue being released from the skin. Also, connective tissue and skin fines are separated from the larger intact skin pieces resulting in a product discharge from the cage mill which consists of a heterogeneous mass of animal skins, separated fatty tissue, connective tissue and skin fines. If desired, water can be added to the skins during the milling operation.

The cage mill product is then subjected to further processing wherein the fat, connective tissue and skin fines are separated from the larger intact animal skin pieces. In this connection, it has been found that the injection of steam into the cage mill product can be advantageously used to melt the fatty tissue contained therein to facilitate the separation of this fat from the skins. Since the animal skin pieces contain proteinaceous matter which is adversely effected by excessive heat, it is important to control the heating of the cage mill product so as to enable subsequent recovery of the proteins in their original or natural state. A temperature range of from approximately 85° to 120° F. (i.e. a temperature sufficient to liquify the fat but not high enough to denature the proteins) is suitable for this purpose.

Upon being heated, the liquid fat is then separated from the animal skins. In the embodiment illustrated in the drawings and more fully described below, the separation technique involves novel holding and phase separation drums which permit advantageous first in-first out processing of the heated animal skins. The holding drums provide uniform heating of the skin pieces while the separation drums efficiently accomplish separation of the liquid fat, connective tissue and skin fines from the animal skin pieces. While the novel holding and phase separation drums constitute an important aspect of the present invention, it should be noted that the unique cage mill impact separation techniques of the present invention can be cooperatively combined with other sizing or separation techniques such as are obtainable through the use of vibrating screens, centrifuges, etc.

Upon being separated from the liquid fat, connective tissue and skin fines, the defatted animal skin pieces are then subjected to a dewatering step such as by pressing and the like in order to effect removal of all liquids contained therein. The use of a blast chiller or other quick freezing device can be advantageously used to facilitate handling and storage of the defatted skins.

It is, therefore, an important object of the present invention to provide an improved method and apparatus for the separation of fatty or adipose tissue from animal skin pieces.

Another object of the present invention is to provide an improved method and apparatus for the separation of fatty or adipose tissue from animal skin pieces which method and apparatus employ unique cage mill type impact separation techniques.

Another object of the present invention is to provide an improved method and apparatus for processing animal skins to produce an improved defatted, non-degraded, non-denatured skin product which is particularly suitable for the production of high quality gelatin.

Another object of the present invention is to provide an animal skin defatting method and apparatus which make suitable for gelatin production animal skins which previously could only be processed in rendering tanks.

Another object of the present invention is to provide an improved method and apparatus for the separation of fatty or adipose tissue from pork skins, which method and apparatus are adapted to break up the cellular tissue of the fatty constituent thereof for releasing the fat from the cellular tissue with a minimum of degradation to the pork skins.

Another object of the present invention is to provide an improved method and apparatus for the separation of fatty or adipose tissue from pork skin pieces which method and apparatus employ unique tempering and liquid fat separation techniques which are adapted for continuous operation on a first in-first out basis.

Another object of the present invention is to provide an improved separation drum which is particularly suitable for providing first in-first out separation of liquid fat, connective tissue and skin fines from defatted animal skins.

Other objects and advantages of the present invention will be apparent from the following detailed description of the accompanying drawings wherein:

FIGURE 1 is a schematic flow diagram of a processing system adapted for separating fatty or adipose tissue from animal skins and embodying principles of the present invention;

FIGURE 2 is a side elevational view, partially in section, illustrating the cage mill type impact separation apparatus suitable for use in defatting animal skins in accordance with the present invention;

FIGURE 3 is an inverted elevational view of the steam injection heater manifold shown in the flow diagram of FIGURE 1;

FIGURE 4 is an enlarged longitudinal sectional view of a steam injection nozzle adapted for use in the steam injection manifold of FIGURE 3;

FIGURE 5 is an elevational view, partially broken away and in section illustrating in detail the holding or tempering drum shown in the processing system of FIGURE 1;

FIGURE 6 is an end view, partially in section, of the inlet end of the holding drum shown in FIGURE 5;

FIGURE 7 is an end view, partially in section, of the outlet end of the holding drum shown in FIGURE 5;

Figure 8:
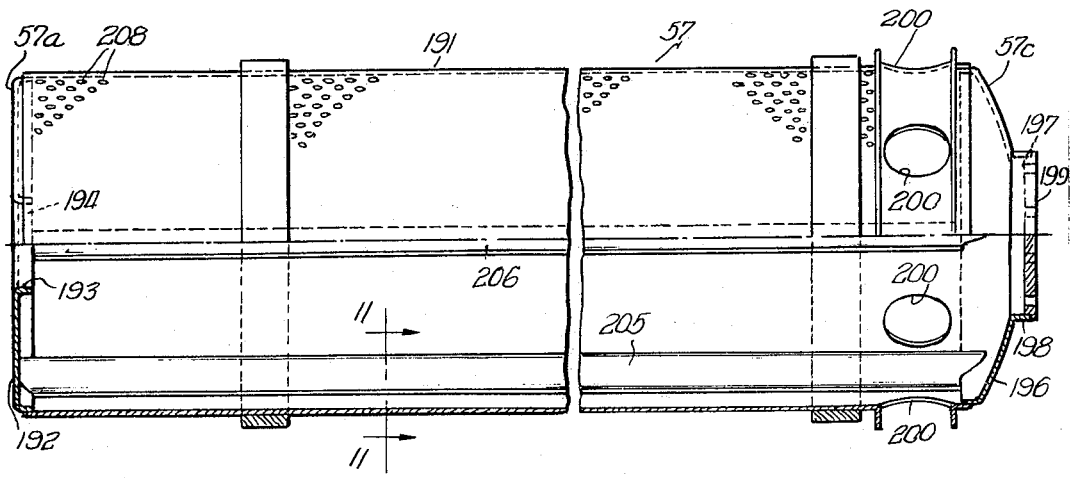
FIGURE 8 is an elevational view, partially broken away and in section, illustrating in detail the separating drum shown in the processing system of FIGURE 1.

As background, it should be noted that pork skins a by-product of the meat packing industry, represent an important source of high grade gelatin. When these skins are removed from the various areas of the hog carcass, layers of fatty or adipose tissue are attached thereto. The larger portions of these skins which are not suited to producing leather have been used as a source of gelatin. In conventional operations, these larger skin pieces have had substantially all the fatty tissue removed therefrom and are then treated with suitable acid curing agents which permit the extraction of gelatin from the skins. Increased demands for gelatin have necessitated using smaller skin pieces, i.e. trimmings, for this purpose.

To obtain a high grade gelatin product, substantially all the free fatty tissue must be removed from the skin pieces prior to the processing thereof. Excess fat on the skin pieces prevents proper penetration of the acid curing agents thereby interfering with the gelatin extraction and, in addition, results in the presence of fat emulsions in the extracted gelatin.

Generally, after the hog skins have been defatted they are placed in a vat wherein they are treated with an acid curing solution and cold water for about 24 hours. The curing solution is then drained off and the gelatin then leached from the skins by means of a series of warm water gelatin extractions. In the first of these extractions, the skins are soaked for about 30 minutes in water having a temperature of about 110° F. The gelatin extracted during this initial step is of the highest quality. Following this step, this proceduce is then repeated with water of a slightly hotter temperature. For example, the second stage might involve using water at a temperature of from 115° F. to 120° F. This water, also containing high quality gelatin, is then drained off after a 30 minute soaking cycle. Additional warm water extractions follow with each succeeding extraction using water of a higher temperature than in the immediately preceding extraction. It has been found that with animal skins processed in accordance with the teachings of the present invention, the quality and amount of gelatin extracted is substantially increased. In particular, pork skin trimmings, when defatted by the unique impact cage mill separation techniques of the present invention, produce from 8 to 10 gelatin extractions while conventional defatting techniques, when employed on like skin trimmings, produce only about 6 to 8 gelation extractions.

Referring to the drawings, and with particular reference to FIGURE 1, the reference numeral 21 generally dseignates an animal skin processing system embodying principles of the present invention. The illustrated embodiment is particularly adapted for defatting pork skins and employs unique cage mill type impact separation techniques which produce a defatted skin product having a minimum of skin degradation. As such, pork skins processed thereby provide an excellent source material for the manufacture of high quality gelatin. In this regard, it should also be noted, that the unique defatting apparatus of the present invention enables the processing of animal skin pieces which previously had to be processed in rendering tanks. Such conventional rendering techniques are unsatisfactory in that they produce a defatted skin product which yields a poorer quality gelatin and, as such, is usually ground up and used as livestock feed.

The unique cage mill type fat separation techniques of the present invention enable the processing of substantially all types of animals skins including pork skin trimmings such as drawknife choice ham pieces, bootjack and flank trimmings and so-called picnic skins. The latter mentioned variety being characterized by tough connective tissue and a thin skin are representative of trimmings which previously were sent to rendering tanks and which now, by reason of the present invention, can be advantageously processed for gelatin extraction.

Hog skin pieces of the bootjack and flank trimming variety having an initial fat content of approximately 60% to 70% when processed in accordance with the techniques of the present invention can, under ideal operating conditions, produce a resultant skin product having a fat content as low as 1%. Similarly, drawknife choice ham pieces having an initial fat content of about 70%, when processed by the unique cage mill type impact separation techniques of the present invention can produce a non-degraded pork skin product having less than 1% fat.

If desired, the feed to the animal skin defatting system of the present invention can consist of a single variety of trimming or a mixture thereof. For example, mixtures of bootjack, flank trim, drawknife ham, and picnics have been advantageously processed at one time in defatting systems constructed and operated in accordance with the present invention.

In the embodiment of the pork skin processing system shown in FIGURE 1, the skins containing fatty tissue are discharged from a bucket 22 into an inclined conveyor 23. Bucket 22 is suspended from a suitable elevated hoist 24 for ease in the loading and discharge thereof. Inclined conveyor 23 includes a conveyor screw 25 which is enclosed in a suitable casing 26 and driven by a motor 27 enabling the hog skin pieces to be upwardly transmitted for discharge into a cage mill feed hopper 28.

In the preferred embodiment of the present invention, feed hopper 28 is coupled to a conventional twin screw conveyor 29 (not fully illustrated) having a pair of conveying screws, one of which is shown in the drawing and designated by the reference numeral 30. A suitable driving means, i.e. an electric motor 31 powers the twin screw conveying members which, in turn, transmit the pork skin pieces from hopper 28 into inlet 32 of cage mill 33.

Cage mill 33 includes a plurality of stages in the form of rotating concentrically disposed cages. In the preferred embodiment of the present invention, cage mill 33 is equipped with two separate rotors which are respectively fixed to alternate cages as is shown in FIGURE 2 and more fully explained below. In this manner, adjacent cages exhibit counter-rotational movement with respect to each other, thereby providing a greater relative speed between adjacent cages that can be effected when said cages exhibit corotational movement with respect to each other. It should again be noted, however, that the present invention is intended to cover cage mill (and equivalent) systems wherein adjacent cages rotate in the same or opposite directions.

Each of the cages generally includes a circular vertically aligned frame having a plurality of horizontal rods extending therefrom, which rods define a generally cylindrical body. Skin pieces which enter at inlet 32 pass through each of the cages by reason of gravitational and centrifugal forces and, on passing from the inner or smallest cage to the outer or largest cage, the skin pieces are subjected to a unique type of impact separation which ruptures the cellular fat structure, thereby facilitating the release of the fat from the skin without appreciable degradation of the skin.

The cage mill specifications vary in accordance with the nature of the pork or other animal pieces being fed to the system as well as in accordance with the requirements of the resultant product. In the illustrated embodiment, which is particularly adapted for processing pork skins, cage mill 33 is a 50 inch, six row cage mill, i.e. it consists of six concentrically aligned cages, the largest of which has a diameter of approximately 50 inches while the inner or smallest cage has a diameter of approximately 23 inches. As is conventional, adjacent cages are rotated in opposite directions. An example of a commercially available cage mill which can be employed for this purpose is a Stedman Stainless Steel 50" Six Row Anti-Friction Bearing Disintegrator (Stedman Foundry and Machine Co., Inc., Aurora, Ind.).

Operation of the mill, i.e. the rotational speed of the cages, varies in accordance with the size and design of the mill as well as in accordance with the type of trimmings being processed. In the 50" six row cage mill previously mentioned, it has been found that rotational speeds of from 200 to 800 r.p.m. (i.e. a corresponding peripheral velocity of from 2,500 to 10,000 feet per minute) are usually satisfactory from processing pork skins with the range of 600–700 r.p.m. (i.e. a periphery velocity of about 7,500 to 8,500 feet per minute) being preferred for this purpose. In this regard, it should be noted that the significant consideration here is the peripheral speed of the cage mill since a larger mill operated at a lower r.p.m. would have a peripheral velocity or fat separating operation equal to a small mill operated at a faster r.p.m. While the above mentioned rotational speeds are suitable for cage mills comparable in size and construction to the preferred embodiment of the present invention, it should also be noted that this inventive process can be carried outside these limits, such as, for example, with cage mill rotational speeds of from 100 to 1,500 r.p.m. and cage mill peripheral speeds from 1,000 to 15,000 feet per minute.

The cage mill product, a heterogeneous mass of pork skins, fatty tissue, connective tissue and skin fines are discharged from cage mill 33 into inlet 34 of a material transmission pump 35 which includes a drive motor 36, outer casing 37 and screw conveyor 38. If desired, pump 35 can be equipped with variable speed mechanisms for controlling the rate of feed into the second cage mill 39. In this regard, it is important to note that cage mill 39 is coupled in series to cake mill 33 for conjoint operation therewith. It should be appreciated, however, that the present invention is not limited to the precise arrangement of two cage mills connected in series as shown in this figure. Accordingly, it is to be understood that the present invention contemplates the use of one or more cage mills of the same or different sizes operated at the same or different speeds and connected in series or parallel.

Inlet 41 of cage mill 39 receives the product discharge from cage mill 33 via process line 40. In the illustrated embodiment, cage mill 39 is a 36 inch, six-row cage mill (i.e. six separate concentrically aligned cages with the largest cage having a diameter of approximately 36 inches). As was true with cage mill 33, in the preferred embodiment of this invention, the respective adjacent cages of cage mill 39 rotate in opposite directions. Rotational speeds which have been found to be suitable for processing pork skins in cage mill 39 are such as produce a peripheral velocity of from around 5,500 to 13,000 feet per minute. However, as was noted above, the process of the present invention can be carried outside these limits.

The product discharge from cage mill 39 is fed into an open hopper 42 of a material transmission pump 43 which is of the same basic design as pump 35 previously described. Material transmission pump 43 includes a motor 44 which operates a screw type conveyor 46 which transmits the product discharge received from cage mill 39 into process line 47. The cage mill product discharge from cage mill 39 is in the form of a heterogeneous mass of pork skins, fatty tissue, connective tissue and skin fines.

In the embodiment of the invention illustrated in FIG-

URE 1, heating of the product from the cage mill is accomplished by a steam injection heater 48. This component in the system is more fully illustrated and described in connection with FIGURES 3 and 4. As is shown in FIGURE 1, steam injection heater 48 includes a manifold housing 49 which is equipped with a plurality of steam nozzle inlets 50 which are sized to receive steam nozzles 51. The steam inlets 50 and nozzles 51 are positioned in heater manifold 49 so that the steam is introduced into the heterogeneous cage mill product in a flow path which is concurrent with the flow of product through conduit 47. Heating of the heterogeneous cage mill product should be controlled in order to avoid denaturing of the proteins in the skins. Generally, in the defatting of pork skins, temperatures of from 85° F. to 120° F. are preferred for purposes of liquifying the fat constituent thereof. Temperatures in excess of this will generally result in a denaturing of the proteins which reduces the quantity and quality of gelatin which can be subsequently extracted from the defatted skin. Temperatures employed with other type animal skins will, of course, vary with the melting point of the fatty tissue and the nature of proteinaceous matter contained in the skin. Accordingly, the operating temperature range from heater 48 is best defined as being that which is sufficient to liquify the fat and which is also low enough so that it does not adversely affect or denature the protein content of the skins.

The use of steam injection techniques such as described in connection with heater 48 necessarily result in the introduction of water in the cage mill product. This is advantageous in that it facilitates the separation of fatty tissue, connective tissue and skin fines from the animal skins. It will be appreciated, however, that while the described steam injection technique offers advantages when used in combination with the cage mill type impact separation techniques of this invention, other types of heating may be suitably employed including, but not limited to, use of heat exchangers and similar devices which do not introduce a liquid or other material into the product stream.

Heater 48 can be controlled by a temperature senser or thermocouple 52 which is positioned on the downstream side of heater 48 in product conduit 47. If desired, thermocouple 52 can be integrally combined with heater 48 (see FIGURE 3).

It has been found in the operation of the system shown in FIGURE 1 that tempering is important in order to obtain uniform heat distribution throughout the fat, connective tissue and skin mixture. In accordance with the present invention, a unique first in-first out tempering stage is accomplished by the use of inclined imperforate rotating holding drums 53 and 54. While a pair of holding drums are shown in the illustrated system, it will be appreciated that one or more of such drums may be used without departing from the unique tempering techniques of this invention.

Upon being heated, the cage mill product is directed through conduit 47 until it comes to an oscillating split-flow valve 56 which operates to more or less equally distribute the product flow into each of the holding drums 53 and 54. As is shown, the conduit 47 includes a T-shaped member 47a, 47b on the downstream side of the valve 56. Arm 47a of conduit 47 communicates with inlet side 53a of holding drum 53 while arm 47b communicates with the inlet side 54a of holding drum 54.

As will be more fully described in connection with FIGURES 5-7, each of the holding drums 53 and 54 is equipped with transverse, circumferential baffles and longitudinal vanes which facilitate the tempering or even heating of the cage mill product. The drums are rotated at a speed which imparts centrifugal force to the cage mill product contained in the drums which is less than the gravitational force applied thereto (i.e. the rotational speed is less than one gravity centripetal acceleration at the outside diameter). The effect of this speed is to provide a lifting and violent dropping, tumbling and agitating action which further facilitates the washing and/or heat tempering of the defatted animal skins. By downwardly inclining the holding drums 53 and 54, first in-first out processing is effected. In other words, the downward slope of the drums provides the through driving force for the material being processed. The transverse baffles (shown in FIGURES 5-7) add a time delay to the system for extending the wash or tempering cycle. It has been found that the novel tempering drums of the present invention are particularly suitable for processing hard to handle product in a sanitary manner and provides a continuous operation which eliminates the necessity for a holding tank.

Following the tempering step, the melted fat, connective tissue, and skin mixture is processed in a separation step. In the illustrated embodiment, a pair of separating drums 57, 58 are employed for this purpose. While these separating drums offer important advantages in connection with the present system, it should be noted that other separating devices, i.e. vibrating screens, centrifuges and the like can be employed for this purpose.

Separating drums 57 and 58 are inclined for providing first in-first out continuous operation in substantially the same manner as was described in connection with holding drums 53 and 54. As is schematically designated by reference numerals 59 and 60, the inlet ends 57a, 58a of separating drums 57, 58, are positioned with respect to outlet ends 53b, 54b of separating drums 53, 54 so that the discharge from holding drums 53, 54 is transmitted to the separating drums 57, 58.

The interior construction of separating drums 57, 58, more fully described below in connection with FIGURES 8–11, generally includes a plurality of longitudinal vanes. In addition, separating drums 57, 58, have an outer cylinder which is characterized by a plurality of holes 57b, 58b, respectively, which are sized so that the majority of liquid fat, fatty connective tissue and skin fines are readily passed therethrough before the fatty connective tissue has time to display its characteristic agglomeration by tumbling. The lard-connective tissue-skin fines effluent from separating drums 57, 58, is collected by receiving wells 61, 62 and transmitted through a conduit 63 for storage and/or further processing. Separating drums 57, 58 in operation also rotate at a speed which imparts a centrifugal force to the solid phase contents thereof which is less than the force of gravity (i.e. the rotational speed is less than one gravity centripetal acceleration at the outside diameter). Outlet ends 57c, 58c, of the separating drums discharge into a hopper type arrangement 64 wherein they are washed with water at a temperature of from 70° F. to 130° F. It has been found that by the use of a water-wash cycle subsequent to the initial separating stage, that the yield and small solids separation from the skin is substantially increased. The washing step is diagrammatically shown by a plurality of nozzles 66 which are positioned in the hopper 64.

A positive displacement screw type product pump 67 operated by a motor 68 drives the defatted skin product into a product line 69 which in turn discharges into the inlet of a second stage holding drum 70. Holding drum 70 includes an inlet 70a and outlet end 70b, and is of a comparable construction to that of holding drums 53 and 54. In this regard, it should be first noted that drum 70 is also inclined for first in-first out operation with the discharge therefrom being transmitted to a separating drum 71. Separating drum 71 is equipped with a construction comparable to that of separating drums 57 and 58 previously mentioned above and more thoroughly described in connection with FIGURES 8–11.

In this second stage holding-separting drums, the remaining melted fat, connective tissue and skin fines are removed from the animal skins. Since the skins have been wetted by the addition of water at the steam injection heater 48 and hopper 64, they are in a very moist condition and a dewatering treatment step is in order for increasing the protein yield per pound of defatted skin. This can be accomplished by means of a dewatering press.

As is shown, product discharge from the outlet end 71b of separating drum 71 is discharged into a hopper 72 which is equipped with a screw type conveyor 73, driven by motor 74, for transmission of the skins to discharge outlet 76. Animal skins from product discharge outlet 76 are deposited into the inlet 77 of a single screw dewatering press 78 which is equipped for first in-first out continuous dewatering of animal skins. While a specific type of dewatering press is illustrated in connection with the flow diagram of FIGURE 1, it should be noted that other types of presses which are capable of handling the defatted animal skins can be substituted in place thereof. The illustrated dewatering press includes an outer jacket 79 and inner cylindrical screen 80 which define an annular hollow area 81. Centrally disposed adjacent the bottom of interior core 78a of the press 78 is a core 82 which engages and activates vertically disposed spindle 83. Spindle 83 has a plurality of interrupted helical screw elements or flights 84 which are all of the same outer diameter and which run at a close fit inside cylindrical screen 80. A plurality of horizontal resistors 86 extend inwardly from the screen and cooperate with the flights 84 to prevent the skins being pressed from turning with the slowly turning spindle 83.

In operation, the cone 82, forced upward by an air cylinder driven by a motor 87 activates spindle 83 which forces the skins against the pre-set resistance of the cone 82. When the downward pressure from the spindle 83 overcomes the pre-set cone pressure, cone 82 moves down and discharges the dried skins into a vibrating discharge conduit 91 which communicates with a funnel guide 92. A pair of mounting springs 88 and 89 serve to minimize vibration from the conduit 91 into the dewatering press 78.

In the illustrated embodiment, funnel guide 92 deposits the dried skins onto a belt conveyor 93. Since the skins are generally in a very soft and flexible condition, it is preferred that they be quick frozen so as to facilitate their packing and subsequent storage. For this purpose, a fluidizing float chill unit 94 equipped with a spreader device 96 is generally suitable. As is diagrammatically shown, the float chiller 94 includes a conveyor belt 97 arranged so that the skins collected thereon are subjected to high velocity-low temperature air streams 98 which accomplish the quick freezing operation. The conveyor belt 97 then carries the rigid skins to a further packaging unit which is diagrammatically represented by an open box 99. The packaged skins are then shipped to gelatin producing locations wherein they are treated with suitable acid curing agents and warm water gelatin extractions.

As was noted above, an important aspect of the present invention involves the unique cage mill type impact separation which provides a rupturing of fatty tissue for release of the fat from the animal skin without incurring appreciable degradation or denaturing of the defatted animal skin product. As such, animal skins processed in accordance with the cage mill type impact separation technique of the present invention provide an excellent source material for the manufacture of gelatin. Another very important advantage of the cage mill impact separation method of this invention is that it permits the handling of animal skin pieces which previously were processed in rendering tanks only, such as, for example, thin skin pieces having strong connective tissue—i.e. picnic skins.

The constructional features of cage mill 33 for effecting this unique type of impact separation are illustrated in FIGURE 2. As is shown, cage mill 33 includes a base 101 on which a pair of U-shaped shaft supporting members 102 and 103 are fixed. Shaft supporting member 102 includes a pair of journaled housing supports 104 and 105 which receive small cage shaft 106. Similarly, support member 103 includes a like pair of journaled housing supports 107 and 108 which receive large cage shaft 109.

Small cage shaft 106 is driven by a suitable power supply (not shown) and has a flanged collar 110 fixed to one end thereof which collar is bolted to the small disc 111. Small disc 111 has a plurality of rod-like cage bars 112 laterally extending from outer end 111a thereof. Intermediate disc 113 is fixedly secured to the opposite end of first row cage bars 112 and serves to provide the supporting means for the third and fifth cages of cage mill 33. Thus, the first, third and fifth cages of mill 33 are co-rotatable with small cage shaft 106.

Similarly, large cage shaft 109 includes a flanged collar member 114 which is bolted to a large disc member 115 from which a plurality of cage bars for the co-rotatable second, fourth and sixth mill cages extend. In particular, the cage mill bars 116 which form the second cage in the mill are fixed to the innermost portion of large disc member 115. Similarly, a plurality of cage mill bars 117, forming the fourth cage of the mill are fixed to large disc 115 in a circular configuration of larger diameter. At the outermost end of large disc 115 are the cage mill bars 118 which form the outermost or sixth cage of the mill. In this connection, it should be noted that the outermost end of cage mill bars 116, 117 and 118 are fixed to cage row rings 116a, 117a and 118a.

Interposed between cage mill bars 116 and 117 are the cage mill bars 119 which form the third cage of the mill 33. Similarly, bars 120 which form the fifth cage are interposed between cage mill bars 117 and 118 of the fourth and sixth stages respectively. Cage mill bars 119 and 120 are both fixed to intermediate disc 113 and are respectively equipped with cage row rings 119a and 120a at their outermost end.

A housing cover 121 completely covers the cages and serves to direct the cage mill product into a discharge outlet 122 which communicates with hopper 34 for transfer to further processing components in the skin defatting system.

Inlet 32 to cage mill 33 is fed with animal skins that are deposited in hopper 28 wherein they are transferred by means of screw type conveyor 30 driven by motor 31. Skins on being received in inlet 32 are subjected to a unique type of separation which is readily distinguishable from the previously mentioned prior art fleshing, hashing, mechanical disintegration and shearing techniques.

The pin spacing and number of cages required for a particular defatting operation as well as the rotational speed of the cages will vary in accordance with the particular types of animal skin pieces being fed to the unit. In this regard, it has been found that a 50 inch, 6 row cage mill having a 6 inch pin spacing (circumferential distance from the edge of one bar to the edge of the next adjacent bar on a given cage) and a one inch row spacing (the distance between the edges of bars of adjacent cages) when operated at a speed of approximately 600–700 r.p.m. advantageously provides effective rupturing of pork skin fatty tissue with a minimum of skin degradation.

The manifold housing 49 and steam injection nozzles 51 of the steam injection heater 48 are illustrated in FIGURES 3 and 4. As is shown, manifold housing 49 generally includes an elongated tubular body 131 terminated on opposite ends by a pair of ferrules or fittings 132 and 133 which are adapted to be connected with process line 47 to provide a continuous flow path for the cage mill product. A plurality of nozzle-receiving fittings 50 are positioned within tubular body 131 and disposed in such manner so as to enable the discharge of steam into the manifold 49 in a direction which is concurrent with the flow of cage mill product therethrough. If desired, a thermocouple temperature sensor 52 can be located at the outlet end of steam manifold as shown in FIGURE 3 or, downstream from the heater 48 as shown in FIGURE 1.

The steam injection nozzles 51, best illustrated in FIGURE 4, include a tubular coupling 134 which has an internally threaded bore 136 adapted to be operatively connected to a suitable steam source. Coupling 134 terminates in a collar 137 which includes an inwardly tapered throat 138 having an internal diameter sized to receive a tubular steam nozzle barrel 139. On the downstream side of throat 138 the collar 137 includes a flange end face 137a which is provided with a recess 137b adapted to receive an outer tubular member 140. By securely fixing tubular member 140 and barrel 139 to collar 137 and by sealing the opposite ends thereof with an outwardly flared nozzle tip 141, a hollow annular chamber 142 is provided which functions as an air insulated wall to minimize product burn-on (i.e. burn-on of the product as it contacts the outer surface of nozzle 51 in manifold 48). A tubular collar 143 is sized to be snugly received within the steam inlets 50 and is fixedly secured to the outer surface of tubular wall 140 for prevention of solids migration up into inlet 50. As is shown in FIGURE 3, the steam injection nozzle projects into the product stream to the manifold center line. In this manner, the introduction of steam into the cage mill product is controlled so as to provide maximum heating with a minimum of interference with the cage mill product flow. Generally, it is preferred that the collar 143 be positioned along the outer tubular member 140 a specific distance, i.e. that which is equal to the length of steam inlet 50 so that the end portion 141a of nozzle tip 141 does not extend beyond the inner ends of the nozzle inlet, as is generally shown in phantom in FIGURE 3 in connection with nozzle inlet 50a.

The construction of holding drum 53 is illustrated in FIGURES 5–7. It is, of course, understood that holding drums 54 and 70 are constructed in the same manner as holding drum 53. As is shown, holding drum 53 includes a generally elongated tubular body 151 which is sectioned into four interconnected compartments 152, 153, 154, 155, by means of four internal bulkheads 156–159. Access to each bulkhead section is provided by a pair of access openings in each of the sections. For example, bulkhead 152 is provided with access openings 152a and 152b. Similarly, bulkhead section 153 is provided with access openings 153a and 153b, bulkhead section 154 with access openings 154a and 154b, and bulkhead section 155 with access openings 155a and 155b. Each of these access openings is equipped with tubular extensions or sleeves 161–168, respectively. During operation of the holding drums, suitable closures, such as, for example, Turntite rubber stoppers may be provided to prevent the contents of the holding drum from escaping through the various access openings. In this regard, it should be noted that each of the access openings is positioned as close as possible to opposite ends of the bulkheads in order to facilitate inspection and access to the respective bulkhead compartments. Tubular body 151 of holding drum 53 is equipped at its inlet end 53a with an end wall 169. As is shown, end wall 169 has a centrally disposed inlet whose inlet 170 is defined by an inwardly turned flange portion 171.

On the opposite or discharge end 53b, a plurality of discharge openings 172–175 are shown. By spacing the discharge openings along the circumferential wall of the holding drum 53, discharge of the tempered cage mill product is greatly facilitated. Lifting of the drum contents during rotation thereof is facilitated by means of a plurality of longitudinal lifting vanes 176–178 which are equidistantly disposed around the interior wall surface 179 of the holding drum 53 (see FIGURES 6 and 7).

Discharge end 53b of drum 53 is equipped with a cover plate 180 which is securely fixed, such as by welding, to outwardly extending sleeve member 181. A sprocket assembly (not illustrated) can be fixed to cover plate 180 for driving or rotating holding drum 53.

The constructional features of separating drum 57 are illustrated in FIGURES 8–11. Separating drums 58 and 71 are of like construction. As is shown, separating drum 57 includes an elongated cylindrical body 191 having an inlet end 57a which includes an end wall 192 having an inwardly turned flange portion 193 which defines inlet 194 to the separating drum. The outlet end 57c of the separating drum is provided with a domed shaped end wall 196 having a central access opening 197 defined by a sleeve 198 having a cover plate 199 mounted thereto. A suitable sproket assembly (not illustrated) can be fixed to cover plate 199 for driving or rotating separating drum 57. A plurality of discharge openings 200 equally spaced around the periphery of the cylindrical section 191 adjacent the discharge section 57c provide an effective means for discharge of the processed animal skins.

Figure 9:
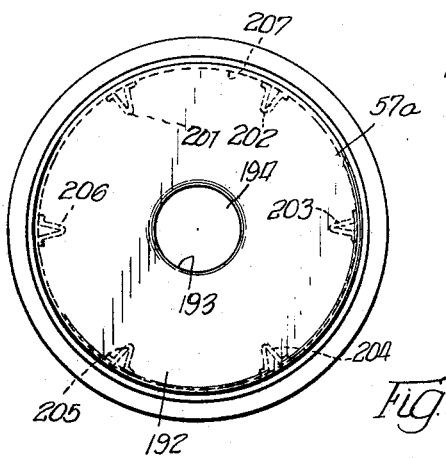
FIGURE 9 is an end view, partially in section, of the inlet end of the separating drum shown in FIGURE 8.
Figure 10:
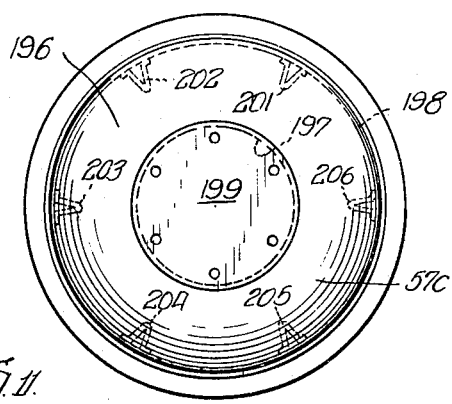
FIGURE 10 is an end view, partially in section, of the outlet end of the separating drum shown in FIGURE 10.

The interior construction of cylindrical drum 57 is best illustrated in FIGURES 9 and 10. As is shown therein, a plurality of longitudinally extending lifting vanes 201–206 are equally spaced around the inner circumferential flange surface 207 of the drum. Each of the vanes 201–206 extend the full length of the drum (see FIGURE 8). During operation, the drum is rotated at a speed which permits the solid phases to be carried to approximately the highest point in the cycle and then freely fall to a lower point in the cycle, i.e. the rotational speed is such that the centrifugal force on the solid phase contents is less than the gravitational force exerted thereon.

As is shown, the elongated cylindrical portion 191 includes a plurality of apertures or holes 208 which are sized and spaced in accordance with properties desired in the finished skin product. In particular, the perforations should be sized so as to permit the melted fat, connective tissue and skin fines to pass through the apertures before the fat cells have an opportunity to exhibit their characteristic agglomeration by tumbling. The holes 208 cover the entire cylindrical portion 191 except for that immediately adjacent longitudinal vanes 201–206.

Figure 11:
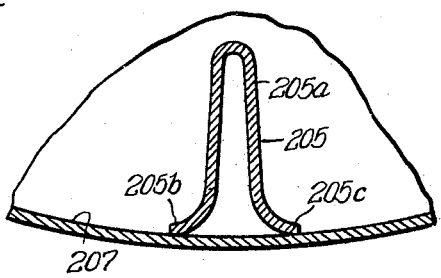
FIGURE 11 is an enlarged fragmentary sectional view taken along the line 11—11 of FIGURE 8 illustrating in cross-section one of the longitudinal vanes located within the separating drum shown in that figure.

In FIGURE 11, the cross sectional configuration of one of the longitudinal vanes in the illustrated embodiment is shown. In this regard, it should be realized that the particular vane shape can vary without departing from the inventive concept involved in the applicants' separating drum. Vane 205 is shown as having a generally U-shaped body 205a with outwardly flared ends 205b and 205c which are secured to the interior drum surface 207 by welding or by other suitable securement means.

In the practice of the present invention, it has been found that separating drums approximately 10 feet in length and having an internal diameter of 30 inches will provide suitable fat separation when equipped with ½ inch holes on 1 and ¹⁄₃₂ inch centers punched in a staggered pattern. Of course, the design characteristics of the holes will be dependent upon the type of skins being processed, the desired degree of fat separation, and upon the efficiency and operational characteristics of the other components in the system.

The following example is given to illustrate the invention and is not intended as a limitation in the scope thereof.

EXAMPLE

A feed consisting of bootjack and flank trimmings having an initial fatty content of between 60% and 70% were fed into a 50 inch, 6 row cage mill having a 6 inch pin spacing and one inch row spacing and operated at a rotational speed of about 700 r.p.m. Upon being so processed, the material was heated to a temperature of 110° F. with tempering to provide uniformity of heat distribution throughout the heterogeneous cage mill product consisting of ruptured fatty cell tissue, connective tissue, skin fines and larger skin pieces. The holding drum was approximately 10 feet in length having a 30 inch internal diameter, equipped with four separate bulkheads and operating at a rotational speed of 30 r.p.m. The holding time in the tempering drums for the skin product was approximately 8 to 10 minutes. Upon being discharged from the holding drums, the heated skin pieces were discharged to a separating drum of approximately 10 feet in length having a 30 inch internal diameter and consisting of perforated set steel having ½ inch holes on one and ½₂ inch centers punched in a staggered design. The separating drum included 6 longitudinal vanes which were equally spaced apart in the interior of the drum. The drum operated at a rotational speed of 30 r.p.m. The fat, connective tissue and skin fines which were passed through the drum holes were discharged to a lard storage area for further processing. The thus defatted animal skins were washed with water at a temperature of 105° F. and further processed in like tempering and separating drums. Upon being discharged from the separating drum, the skin pieces were pressed in a single screw dewatering press of a type generally shown by FIGURE 1 and from there, discharged to a blast chiller wherein the dried skins were subjected to air blasts at a velocity of 40 feet per second and a temperature of 0° F. for a period of 10 minutes at which time they were completely frozen. Animal skins treated in accordance with this technique were found to have a fat content of 5%.

While in the foregoing specification, a specific embodiment of the present invention has been set forth in detail, it will be apparent to those skilled in the art that many of these details may be varied without departing from the spirit and scope of this invention.

We claim:

1. The method of processing animal skins having fatty tissue attached thereto for removal of said fatty tissue to produce a substantially fat-free and non-degraded animal skin which is particularly suitable for gelatin extraction, said method including the steps of: introducing animal skin pieces having fatty tissue attached thereto into the inlet of a cage mill having a plurality of concentrically disposed rotatable cages, each of said cages including a generally vertically disposed circumferential frame having a plurality of generally horizontally disposed bars extending therefrom, the inlet of said cage mill being generally centrally located with respect to said cages, whereby skin pieces are processed by progressively passing by gravity from the innermost to the outermost cages; rotating said cages in a manner wherein adjacent cages exhibit relative rotational movement with respect to each other, at least one of said cages rotating at a peripheral speed of from 1,000 to 15,000 feet per minute, whereby impact separation of the fatty tissue attached to said skin pieces is achieved and said fatty tissue is released from the skin pieces without appreciable degradation of said skin pieces; collecting a skin-fat heterogeneous cage mill product adjacent the outermost cage; heating said heterogeneous skin-fat cage mill product to a temperature of from 85° F. to 120° F. to liquify the fat constituent thereof; and, separating said liquified fat from said skin pieces to produce a substantially fat-free and non-degraded animal skin which is particularly suitable for gelatin extraction.

2. The method of claim 1 wherein said concentrically disposed cages are rotated in a manner wherein adjacent cages exhibit counter-rotational movement with respect to each other.

3. The method of claim 1 wherein the skin-fat heterogeneous cage mill product is heated by injecting steam therein.

4. The method of claim 1 wherein said heated skin-fat cage mill product following said heating step is rotated in an imperforate holding drum of open-ended construction, said holding drum being generally inclined with the inlet thereof located at a higher elevation than the outlet thereof and being rotated at a speed which imparts a centrifugal force to said cage mill product which is less than the gravitational force thereon, thereby enabling said processed animal skins and fat to be agitated and tumbled on a first-in, first-out basis for effecting uniform heating of said cage mill product mass.

5. The method of claim 4 wherein said heated cage mill product, after being processed in said holding drum, is transmitted into an open-ended inclined perforate separating drum, said separating drum having its inlet end at a higher elevation than its outlet end for effecting first-in, first-out processing of animal skins therethrough, the perforations in said separating drum being sized to permit the passage of liquified fat therethrough, said perforate separating drum being rotated at a speed which imparts a centrifugal force to said animal skins which is less than the gravitational force thereon, whereby the animal skins contained therein are carried by centrifugal force to approximately the highest point in said cylinder and then allowed to freely fall to the lower area thereof.

6. The method of claim 5 wherein said animal skins are recovered from said perforate drum and washed with a washing liquid maintained at a temperature of from 85° F. to 120° F.

7. The method of claim 6 wherein said animal skins following said washing step are transmitted to a second perforate drum, said second perforate drum being rotated at a speed which imparts a centrifugal force to said animal skins which is less than the gravitational force thereon, and said perforations in said drum being sized to permit the passage of liquified fat and water therethrough.

8. The method of processing animal skins having fatty tissue attached thereto for removal of said fat to provide a substantially fat-free and non-degraded animal skin product which is particularly suitable for gelatin extraction, said method including the steps of: introducing the animal skins having fatty tissue attached thereto into the inlet of the cage mill, said cage mill including a plurality of concentrically disposed rotatable cages, each of said cages having a generally vertically disposed circumferential frame which includes a plurality of generally horizontally disposed bars extending therefrom, the inlet of said cage mill being generally centrally located with respect to said cages, whereby skin pieces are processed by progressively passing by gravity from the innermost to the outermost cages, rotating said cages at speeds of from 100 r.p.m. to 1,500 r.p.m. in a manner wherein adjacent cages exhibit relative rotational movement with respect to each other, at least one of said cages rotating at a peripheral speed of from 1,000 to 15,000 feet per minute, the rotational movement of said cages producing impact separation of the fatty tissue attached to said skin pieces wherein said fat is released therefrom without appreciable degradation of said skin pieces; collecting a skin-fat heterogeneous cage mill product adjacent the outermost cage; heating said heterogeneous skin-fat cage mill product to a temperature of from 85° F. to 120° F. to liquify the fat constituent thereof; introducing said heated cage mill product into an open ended and inclined imperforate holding drum, rotating said imperforate holding drum at a speed which imparts a centrifugal force to said cage mill product which is less than the gravitational force thereon, thereby enabling said processed animal skins and fat to be agitated and tumbled for processing said skins on a first-in, first-out basis to achieve improved heat distribution therein; recovering the cage mill product from said imperforate holding drum and introducing said processed cage mill product into an open-ended inclined perforate separating drum, said separating drum having its inlet end at a higher elevation than its outlet end for effecting first-in, first-out processing of animal skins therethrough, the perforations in said holding drum being processed to permit the passage of liquified fat therethrough; recovering the animal skins from said perforate drum and washing said skins with a washing liquid maintained at a temperature of from 85° F. to 120° F.; introducing said washed animal skins into a second perforate separating drum, rotating said second perforate separating drum at a speed which imparts a centrifugal force to animal skins which is less than the gravitational force thereon, said second perforate separating drum having perforations therein sized to permit the passage of liquified fat and water; and, recovering the thus procesed animal skin pieces from said second perforate holding drum and extracting residual water therefrom.

References Cited

UNITED STATES PATENTS

| | | | |
|---|---|---|---|
| 144,830 | 11/1873 | Carr | 241—188.5 |
| 518,010 | 4/1894 | Stedman | 241—188.5 |
| 526,322 | 9/1894 | Lister | 241—2 |
| 1,215,424 | 2/1917 | Spensley | 241—188.5 |
| 2,748,152 | 5/1956 | Sifferd et al. | 260—412.6 |
| 2,992,247 | 7/1961 | Grettie | 260—412.6 |
| 3,058,830 | 10/1962 | Christianson | 260—412.6 |
| 3,078,165 | 2/1963 | Alberts | 260—412.6 |
| 3,078,287 | 2/1963 | Downing | 260—412.6 |
| 3,222,384 | 12/1965 | Blumberg | 260—412.6 |

FOREIGN PATENTS 86,352  10/1957  Netherlands.

LEON ZITVER, Primary Examiner

HOWARD T. MARS, Assistant Examiner

U.S. Cl. X.R.

23—280; 241—2, 27, 188.5; 260—118